May 17, 1960 C. R. ADAMS 2,936,635
MOTION CONVERTER
Filed Nov. 25, 1957 2 Sheets-Sheet 1
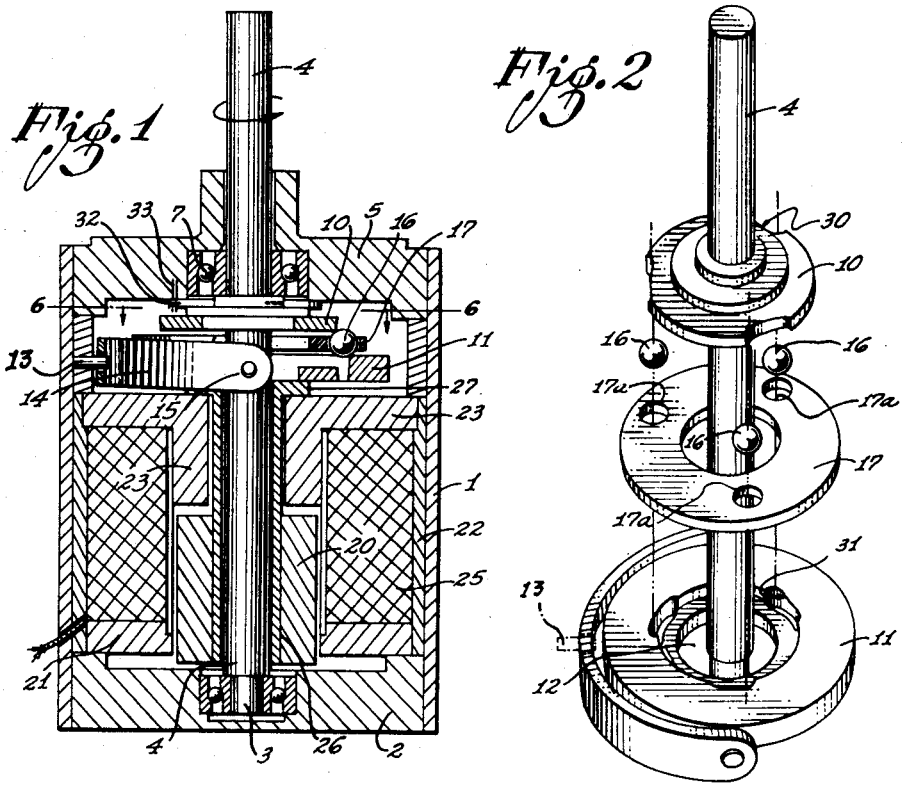
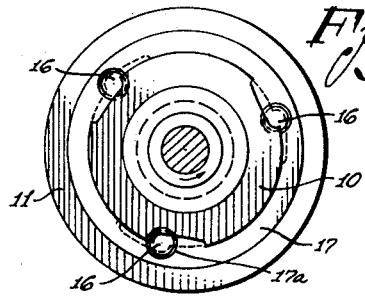
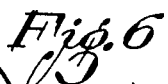
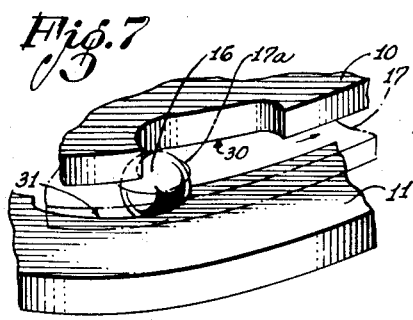
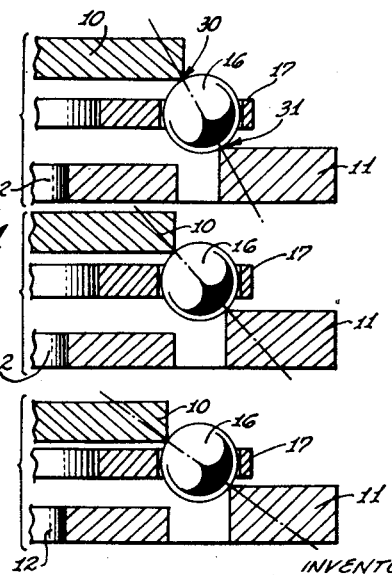
INVENTOR:
Clarence R. Adams
By Hubert E. Metcalf
His Patent Attorney May 17, 1960  C. R. ADAMS  2,936,635
MOTION CONVERTER
Filed Nov. 25, 1957  2 Sheets-Sheet 2
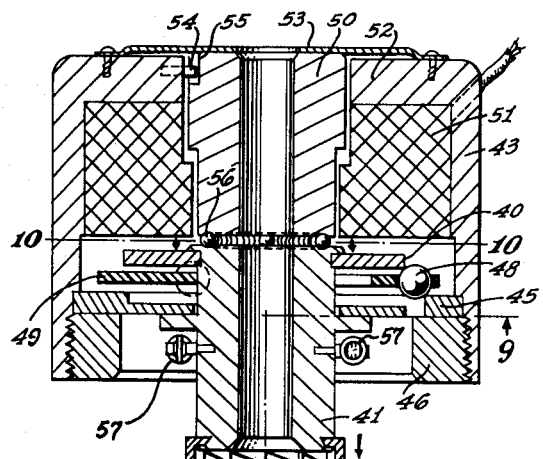
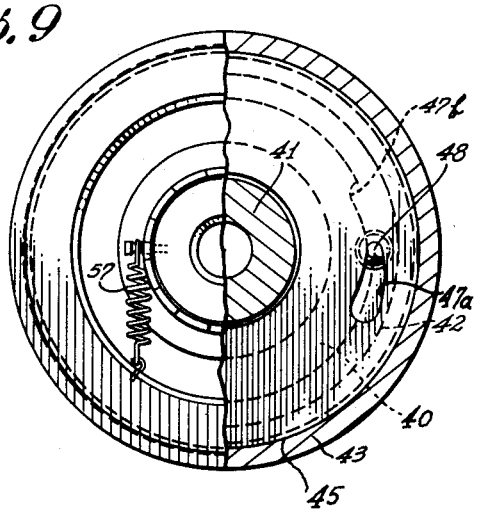
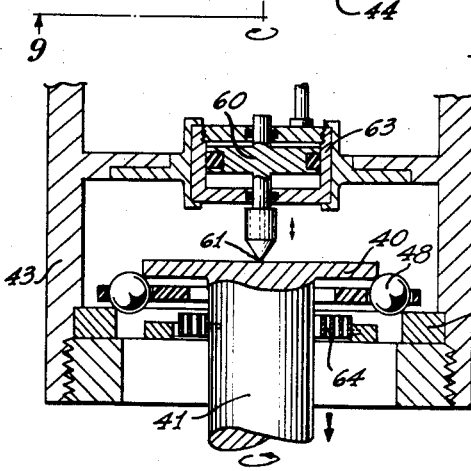
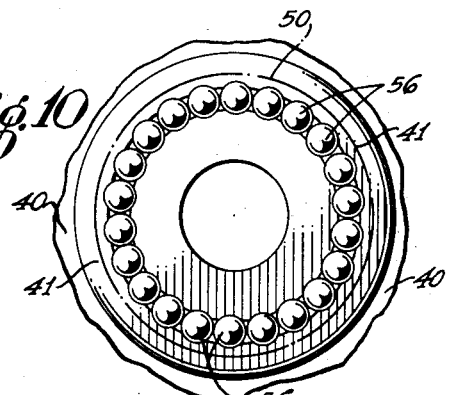
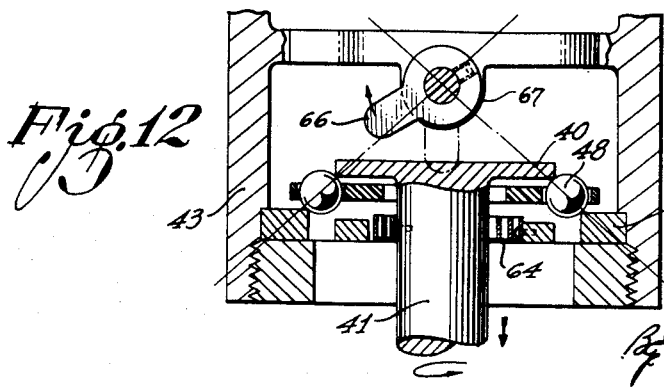
INVENTOR
Clarence R. Adams
His Patent Attorney United States Patent Office 2,936,635
Patented May 17, 1960

2,936,635
MOTION CONVERTER

Clarence R. Adams, La Canada, Calif., assignor to Herbert E. Metcalf, Malibu, Calif., Carol R. Metcalf, administratrix of said Herbert E. Metcalf, deceased Application November 25, 1957, Serial No. 698,829

14 Claims. (Cl. 74—89)

My invention relates to rotary actuators and more particularly to devices for converting a linear motion into a rotary motion. My device has particular usefulness as a component of stepper motors for providing shaft movement in precise angular increments.

Among the objects of my invention are:

To provide a rotary actuator mechanism adapted for operation by any means providing a linear thrust.

To provide a rotary actuator ideally adapted for solenoid operation.

To provide a rotary actuator capable of handling relatively high friction loads.

To provide a rotary actuator capable of precision operation.

To provide a novel camming mechanism between two relatively movable members wherein relative radial movement of the members is substantially eliminated.

To provide a rotary actuator having a low friction camming mechanism for transforming linear into rotary motion and vice versa.

To provide a solenoid powered rotary actuator of high torque.

To provide a novel ball and low friction race camming device for converting axial into rotary motion.

And to provide a rotary solenoid of simple construction and precise output.

Briefly stated the basic mechanism of the present invention comprises a pair of coaxial members coupled by a ball bearing camming construction which permits conversion of axial to rotary motion on one stroke of the device and rotary back to axial motion on the return stroke. The initial linear thrust may be applied to one of these members mounted for both axial and rotary motion, this first member being coupled to the other member normally held stationary, by balls operating in races of novel contour. The linear thrust may well be provided by a solenoid core, a cam, a piston or in fact any other device moving linearly.

The camming elements comprise an arcuate edge on one member and an arcuate edge on the other member; these edges being in the plane of the members throughout the extent. The edges on the two members diverge in one arcuate direction and are spaced radially so that a bearing ball can be positioned with only two edge contacts in a diagonal line across the ball. The edge races on the two members are spaced so that the balls will contact the edge races both at the widest spacing of the edges and at the narrowest spacing of the edges. The curve of the edges on both members is preferably made such that the ball path is centered on the axis of the movable member. Three sets of camming elements are preferably used equally spaced around the axis of the movable element, and the balls are maintained in synchronism by a ball spacer disc positioned preferably between the two elements having apertures therein wherein the balls are loosely held. Thus when the position of the movable member is such that the balls are positioned between the edges of the two members at their closest points, the members are at their maximum spacing, and contrarywise, when the balls are in contact with the edges at their widest spacing the members are closest together. The camming action thus provided will cause a combined axial and rotary motion to be provided when a linear thrust is imparted to the movable member as by a solenoid with return to the original position as by power stored in a spring for example.

My invention will be better understood with all its objects and advantages by reference to the ensuing description of the drawings in which:

Figure 1 is a longitudinal view partly in section and partly in elevation of my invention as embodied in a solenoid operated converter in which the output shaft has only a rotational movement.

Figure 2 is an expanded perspective view of the novel camming elements used in the device of Figure 1.

Figures 3, 4 and 5 are fragmentary cross-sectional views of the camming elements taken with the ball in various positions along the ball races.

Figure 6 is a diagrammatic view partly in section taken on lines 6—6 of Figure 1.

Figure 7 is a perspective fragmentary view of the camming elements showing the arcuate races.

Figure 8 is a longitudinal view partly in section showing a solenoid operated device embodying the camming elements of the present invention in which the output shaft has a combined axial and rotary motion.

Figure 9 is a view partly in section and partly in elevation taken as indicated by the line 9—9 in Figure 8.

Figure 10 is a sectional view in end elevation taken as indicated by the line 10—10 in Figure 8.

Figure 11 is a longitudinal sectional view of a portion of a piston operated converter.

Figure 12 is a longitudinal sectional view of a portion of a cam operated converter.

Referring first to the embodiment shown in Figures 1 to 7 inclusive, this device provides rotation only in the output shaft, the power being supplied from a linearly moved solenoid core.

In Figure 1 a hollow cylindrical casing 1 is provided at one end with a thrust plate 2 carrying a central thrust bearing 3 so that output shaft 4 may rotate therein but is prevented from moving axially. The other end of casing 1 is closed by an output plate 5 through which output shaft 4 passes to project therebeyond, the shaft 4 being journalled in an output ball bearing 7. Shaft 4 is thus positioned and axially fixed within casing 1 but is free to rotate.

Inside of output plate 5 a driven disc 10 is firmly attached to output shaft 4. An opposing disc which will hereinafter be referred to as driving disc 11 is floating; a central aperture 12 being provided therein to clear the shaft 4. Driving disc 11 is, however, supported radially by a yoke 14 of semicircular shape extending around the periphery of driving disc 11 as shown in Figure 2 and is diametrically attached to driving disc 11 by loosely mounted yoke pins 15 having the ability to rotate slightly to enable yoke 14 to rock, this yoke being held from rotating by a rocking connection with a casing pin 13 halfway between yoke pins 15 as best seen in Figure 1. This type of construction is shown, described and claimed in the copending application of Courtney, Serial No. 723,317 filed March 24, 1958. Thus driving disc 11 cannot rotate, but does have a limited axial motion. Driving disc 11 and driven disc 10 are coupled by a plurality of balls 16 (preferably three) operating in camming races later to be described. Balls 16 are kept in synchronism by a ball spacer 17 preferably made of a plastic such as "Teflon" for example, each ball 16 resting loosely in a circular aperture 17a as shown. Axial thrust is applied to driving disc 11 by a solenoid core 20 operating in a magnetic circuit consisting of cross plate 21, cylinder 22 just inside of casing 1 and core plate 23 extending inwardly and then axially at right angles to oppose core 20. All these parts 21, 22, and 23 are of easily magnetizable material and enclose a solenoid coil 25 which, when energized, will move core 20, which is only loosely confined, toward the output end of the casing 1. Core 20 is lined with a brass sleeve 26 extended toward driving disc 11 to terminate in a driving shoulder 27 engaging driving disc 11. As neither driving shoulder 27 nor driving disc 11 rotate, no antifriction bearing is needed between these elements. Energization of solenoid coil 25 will thus apply axial thrust to driving disc 11.

The axial movement of driving disc is translated into rotational movement of the driven disc 10 by the camming action of the coupling balls and cooperating races, these novel races being best shown in Figures 2, 3, 4 and 7.

Referring next to these figures, the driven disc 10 is provided with preferably three outside arcuate cuts to provide arcuate edges 30 forming the ball races on this disc 10. The driving disc 11 is provided with three cooperating inside cuts providing arcuate edges 31 forming the ball races on the driving disc 11. Edges 31 are spaced radially outwardly and below edges 30. The cuts are made to provide edge races which diverge or converge as relative rotation takes place between the discs, so that the balls 16 are contacting the small ends of the cuts when the balls 16 are at one end of the rotational stroke of the driven disc 11 and contacting the large ends of the cuts when at the other end of the rotational stroke. The small and large ends of the opposed races are reversed to provide these situations and because of the differing distance between the edge races, the axial motion of the driving disc toward the driven disc causes the latter disc to rotate as the discs approach each other. In Figure 3 the ball 16 is between the edges of races 30 and 31 with the smallest distance therebetween but with consequent maximum disc spacing; in Figure 4 the ball 16 is midway in the stroke; along the race, and in Figure 5 the discs 10 and 11 have their minimum spacing with maximum rotation of the driven disc 10. The return stroke may be accomplished by power stored in a spiral spring 32 for example, attached at one end to shaft 4 between the output end plate 5 and driven disc 10 and to the output end plate 5 by a pin 33 as shown in Figure 1. If desired the edges 30 and 31 can be slightly beveled.

The camming mechanism described above is also well adapted for use in a solenoid actuator in which the output shaft is simultaneously moved axially and rotationally by an axial thrust. Such a device is shown in Figures 8, 9, and 10.

Here, a shaft disc 40 is inwardly attached to an output shaft 41 loosely journalled in a stationary disc 45 in the end of a cylindrical housing 43, the shaft 41 terminating outwardly in a jaw clutch 44 for example, for clutching into a load in any manner well known in the art. Stationary disc 45 is held in place parallel to shaft disc 40 by a ring 46 threaded into the open end of housing 43. As in the first embodiment, outside arcuate cuts 47a are made into shaft disc 40 and inside arcuate cuts 47b are made into stationary disc 45 to provide three sets of edge races, balls 48 being used, as before, to couple the discs 40 and 45. A ball spacer 49 is also used between the discs to synchronize the balls.

Axial thrust is provided by solenoid core 50 loosely operating inside a solenoid coil 51 held in housing 43 by a core end plate 52. Core 50 is held in place by end cap 53.

Core 50 is held from rotation by pin 54 operating in core slot 55, and thrust is transmitted to shaft disc 40 by a single row of small balls 56 between disc 40 and the thrust end of core 50 as best shown in Figures 8 and 10. Friction is thus held in a minimum as shaft disc 40 rotates.

When the balls contact the small ends of the edge races 47a and 47b, the discs 40 and 45 are farthest apart, normally held in that position by return springs 57 tangentially connecting shaft 41 and casing 43 as shown in Figure 9. Axial thrust applied by core 50, when solenoid coil 51 is energized, forces the disc 40 toward disc 45 thereby rotating shaft disc 40 and output shaft 41. The axial motion of the jaw clutch permits clutching into a load and the ensuing rotation of the shaft rotates the load. After the solenoid coil pulse ceases, the springs 57 return the jaw clutch 44, shaft 41, shaft disc 4 and core 50 to the original position.

Because the camming elements of the present invention can form a complete assembly separate from the power source, axial thrust can readily be provided by a piston 60 axially bearing on a single contact point 61 on shaft disc 40 as shown in Figure 11, wherein a cylinder 63 is provided mounted in casing 43, and in which piston 60 operates, which piston may be hydraulically or pneumatically moved. In this modified form of my invention I may prefer to use a spiral return spring 64 to return the piston 60 after a downward movement.

In a similar manner, thrust can be applied to the shaft disc 40 by a cam 66 rotated in a cam bearing 67 in any convenient manner. The action of the camming elements is exactly the same in all three instances, operating to provide a combined rotational and axial movement to an output shaft. The devices of Figures 11 and 12 show the use of four balls and races.

Several advantages of the devices described above should be noted. The camming races provide only a two point contact with the ball, these contacts being imparted diagonally across the ball. When a plurality of race and ball elements are used, equally spaced around the axis of the rotating element, the ball contact diagonals meet in the axis of the device and because of this arrangement no cocking or lateral slope can take place between the two discs. As the balls ride on edges, or at least on edges only slightly beveled, no substantial surface is provided to pick up and accumulate dust, thereby providing long life. Life tests to date have shown millions of cycles without appreciable race or ball wear.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A rotary actuator comprising a pair of adjacent coaxially mounted discs, one of said discs having an outside facing generally circular edge, the other of said members having an inside facing generally circular edge, said edges being at different radial distance from the axis of said discs, both of said edges being generally centered on said axis, said edges having a plurality of pairs of opposed arcuate cuts therein each of said cuts providing an arcuate edge ball race, said races being in the plane of said discs throughout the extent thereof, the edge races on the two discs being of progressively increasing distance from the disc axis in one arcuate direction, said edge races in each pair being opposed and spaced radially to be offset one above the other, a bearing ball positioned between said edge races of each pair with two only arcuate edge contacts therewith in a diagonal line across the ball at an angle to the axis of said discs, the curve of the edge races on both discs being made such that the ball path is centered on said axis, all in such manner as to provide a ball path slanting with respect to the planes of said discs thereby providing relative axial and rotary movement of said discs as said balls traverse said races, means positioned between said discs for retaining said balls in said races, and power means for moving one of said discs axially to rotate one of said discs.

2. Apparatus in accordance with claim 1 wherein one of said discs is mounted to be stationary and the other disc is mounted to have a combined axial and rotary motion and wherein said power means is applied to move said latter disc.

3. Apparatus in accordance with claim 2 wherein said power means include a solenoid core movable axially by energization of a solenoid coil.

4. Apparatus in accordance with claim 1 wherein one of said discs is mounted to rotate only, wherein the other of said discs is mounted to move axially only, and wherein said power means is applied to said latter disc to rotate the other disc.

5. Apparatus in accordance with claim 4 wherein said power means includes a solenoid core movable by energization of a solenoid coil.

6. A rotary actuator comprising two members relatively rotatable about a common axis, a plurality of cam and ball assemblies intercoupling said members for relative rotation of said members upon receipt of axial thrust from the other of said members, said assemblies being circumferentially spaced about said members, and each of said assemblies including a pair of opposed cam edges, one on each of the members, extending generally in circumferential directions with reference to said common axis, and spaced radially from one another with respect to said common axis, the innermost of said cam edges facing radially outward, and the outermost of said cam edges facing radially inward, said cam edges being located in two parallel planes which are at right angles to and spaced apart along said common axis, the opposed cam edges of each such pair being of increasing distance from said common axis from one end to the other, both in the same circumferential direction, and each of said assemblies further including a bearing ball positioned between and in engagement with the cam edges of the corresponding pair of opposed cam edges, and means for retaining the balls of said assemblies in engagement with said cam edges, all in such manner as to provide ball paths extending generally circumferentially about said common axis, and slantingly with reference to a plane at right angles to said axis.

7. Apparatus in accordance with claim 6 wherein one of said members is stationary with the other member mounted to be both axially and rotationally movable.

8. Apparatus in accordance with claim 6 wherein one of said members is limited to rotational movement only, and wherein the other of said members is limited to axial movement only.

9. Apparatus in accordance with claim 7 wherein power means are provided to impart an axial movement only to said movable member.

10. Apparatus in accordance with claim 8 wherein a power source is provided to move said axially movable member to create a rotational movement of said rotatable member.

11. Apparatus in accordance with claim 8 wherein a power source is provided to move said axially movable member to create a rotational movement of said rotatable member and wherein said power source is an axially movable solenoid core.

12. Apparatus in accordance with claim 7 wherein a solenoid core is positioned to impart an axial thrust to said movable member.

13. Apparatus in accordance with claim 7 wherein a solenoid core is positioned to impart an axial thrust to said movable member wherein means are provided to prevent said core from rotating, together with an antifriction bearing between said core and said movable member.

14. Apparatus in accordance with claim 7 wherein a solenoid core is positioned to impart an axial thrust to said movable member wherein means are provided to prevent said core from rotating, together with a ball bearing between said core and said movable member.

References Cited in the file of this patent
UNITED STATES PATENTS

| | | |
|---|---|---|
| 2,328,501 | Schanzer | Aug. 31, 1943 |
| 2,617,949 | Leland | Nov. 11, 1952 |